April 21, 1942.    H. T. KRAFT    2,280,637
MEANS FOR BALANCING WHEELS
Filed Feb. 6, 1941
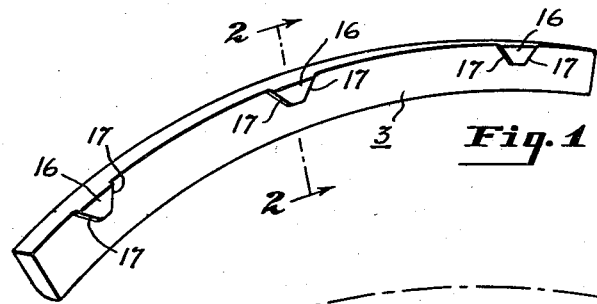
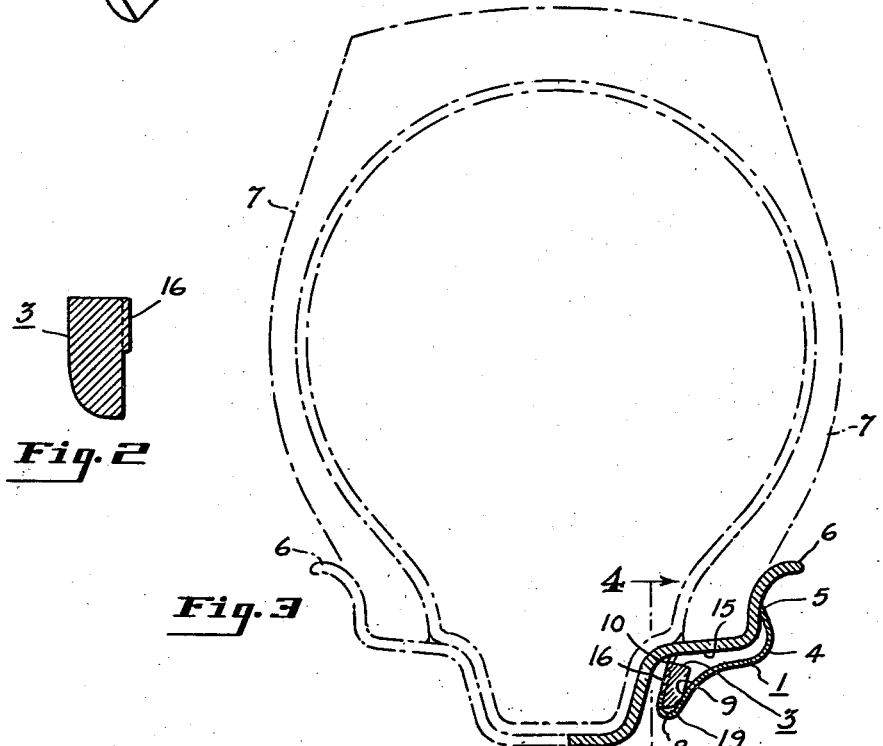
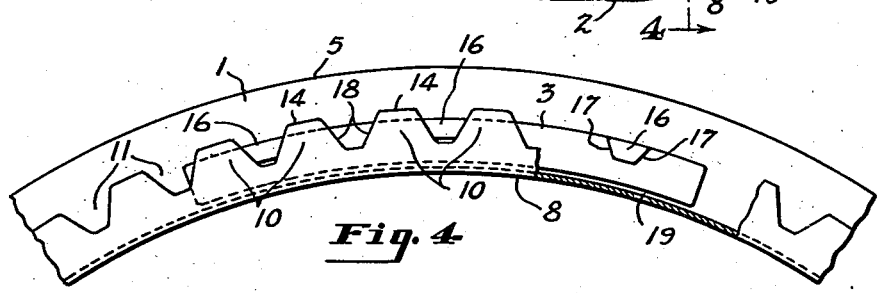
INVENTOR
*Herman T. Kraft*
BY
*Evans + McCoy*
ATTORNEYS Patented Apr. 21, 1942

2,280,637

UNITED STATES PATENT OFFICE 2,280,637

MEANS FOR BALANCING WHEELS

Herman T. Kraft, Akron, Ohio, assignor to The General Tire & Rubber Company, Akron, Ohio, a corporation of Ohio Application February 6, 1941, Serial No. 377,629

5 Claims. (Cl. 301—5)

This invention relates to wheel balancing devices, and more particularly to an improved weight and ring combination for balancing automobile wheels. This application is a continuation-in-part of my co-pending application Serial No. 320,741, filed February 26, 1940.

It is an object of the present invention to provide a generally improved wheel balancing means, including a ring for attachment to the wheel to be balanced and a weight supported by the ring, in combination with means for resisting circumferential movement of the weight about the ring.

Another object of the invention is to provide an improved wheel balancing ring and weight combination in which means is provided for readily securing the weight in a number of different circumferential positions in the ring.

Another object is to provide, in a device of the character described, improved means for interlocking the weight and the ring to avoid displacement of the weight and to prevent rattling and vibration of the weight.

More specifically, the invention aims to provide an improved weight for use in trim rings, the weight having integral projections receivable in slots between spaced tabs on the trim ring to make a secure interlocking connection between the weight and the ring. A still further object of the invention is to provide wheel balancing means, simple in design and construction, and inexpensive to manufacture, particularly with respect to the provision of balancing weights of different sizes. Other objects and advantages of the invention will become apparent from the following detailed description of the invention made in connection with the accompanying drawing, in which:

Figure 1 is a perspective view of my improved wheel weight;

Fig. 2 is a sectional detail through the weight, taken approximately on the line indicated at 2—2 of Fig. 1 and enlarged with respect to that figure;

Fig. 3 is a radial sectional view, with parts removed, through the rim of an automobile wheel having the balancing means of the present invention attached thereto. In this drawing parts of the tire and rim, not essential to the present invention, have been shown in broken lines; and Fig. 4 is an elevational detail, partly in section and with parts broken away, of the removable ring and the balance weight contained therein. This view is taken approximately on the line indicated at 4—4 of Fig. 3, the wheel rim being omitted.

Referring to the drawing by numerals of reference which indicate like parts throughout the several views, the structure of the invention may be briefly described as comprising a ring 1 of relatively thin springlike metal that attaches to a rim 2 of a conventional automobile wheel and receives a weight 3 provided with means that interlocks with the ring to prevent circumferential movement of the weight relative to the ring and the rim.

The ring 1 may be made of thin sheet steel or brass in the form of an ornamental bead or trimming annulus or disc such as are customarily used to decorate the wheels of automobiles. The ring extends completely around the inside of the wheel rim 2 and is bent at 4, so that one edge 5 seats against a rim flange 6 that holds a tire 7 on the rim 2. Adjacent the other edge of the ring 1 is formed a circumferentially extending reverse bend 8, which provides a generally U-shaped channel 9, also extending circumferentially about the ring.

Adjacent the reverse bend 8 the marginal edge portion of the ring is formed with a series of tapered and circumferentially spaced teeth or tabs 10, separated from one another by a series of uniformly and circumferentially spaced tapered slots 11. In applying the ring 1 to the wheel rim 2, ends 14 of the tabs 10 are pressed against and bite into inwardly directed circular surface 15 of the rim, thereby holding the trim ring and the weight in place.

The weight 3 is in the form of an elongated strip and is preferably made of a heavy metal, such as lead. This material allows the weight to be bent to fit snugly within the channel 9 and also reduces objectionable vibration and rattling. As shown in Fig. 2, the strip is generally deeper in a radial direction than it is wide, to more closely conform to the shape of the channel 9. However, other cross-sectional shapes may be employed for the weights, depending upon the particular cross-sectional configuration of the specific trim or holding ring with which the weights are to be used.

At uniform intervals along the strip or weight, and corresponding to the uniform or equal spacing of the slots 11, or a multiple thereof, lateral projections 16 are formed on one side of the weight strip 3. These projections are received within the slots 11 to provide an interlocking connection between the weight and the ring. By reason of the tapered form of the tabs or teeth 10 the edges 18 thereof slope toward one another. The projections 16 on the weight 3, formed to a complemental trapezoidal shape with tapered sides or edges 17, become wedged tightly into the slots 11 between the tabs 10.

In utilizing the weight and ring combination of the present invention, the wheel is balanced in the usual manner to determine the amount of added weight necessary to establish equilibrium and the proper location for such weight or weights on the circumference of the rim 2.

The weights, one of which is illustrated at 3 in the drawing, are provided in strips of different lengths to afford the different weights most frequently used. If desired, the weight material may be provided in a continuous strip from which suitable lengths are cut as desired. A weight of appropriate length is inserted in the channel 9 of the ring with the projection or projections 16 of the weight disposed in the slot or slots 11 and with the sides 17 of the projection or projections pressed tightly against the edges 18 of the tabs.

As shown in Figs. 3 and 4, the tabs or teeth 10 are of sufficient length to extend over and project beyond the outer side or edge of the weight 3. This arrangement insures that the edges 14 of the projecting teeth or tabs positively engage the surface 15 of the wheel rim. Furthermore, the slight bending in of the extreme end portions of the tabs 10, resulting from pressing the strip into position, causes such tip ends to overlie the weight 3 and thereby provide a mechanical lock which prevents dislodgment of the weight from the channel 9. Additionally, this bending of the tip ends of the tabs 10 operates to force the weight toward the reverse bend 8 at the bottom of the channel 9, so as to press the tapered sides 17 of the projections 16 firmly against the edges 18 of the tabs. To insure that the projections 16 seat against the tapered sides of the tabs 10, the channel 9 is made sufficiently deep so that when the weight 3 is in normal position with the projection or projections 16, seated in the slot or slots 11, the radially inner edge of the weight is spaced from the bottom of the channel 9, as indicated by clearance 19.

The use of lead for the weights is of additional advantage in that any irregularity or slight misfitting of the projections 16 in the slots 11 can be accommodated by a slight pressure-induced deformation of the projections 16. In this manner, a tight interlocking connection may be assured without precise adjustment and without the use of special tools.

While it has been indicated that the forcing of the ring 1 into position serves to bend over the tip ends of the tabs 10, deformation or bending of a suitable number of the tabs may be effected in assembly by striking the projecting ends 14 of the tabs with a hammer before the ring is placed against the wheel rim. By thus locking the weight in place before the ring is applied to the wheel rim, circumferential displacement or mislocation of the weight relative to the ring is avoided during assembly.

The principles of the present invention may be utilized in various ways, numerous modifications and alterations being contemplated, substitution of parts and changes in construction being resorted to as desired, it being understood that the embodiment shown in the drawing and described above is given merely for purposes of explanation and illustration, without intending to limit the scope of the claims to the specific details disclosed.

What I claim is:

1. In combination for balancing a wheel, a metal ring having a continuous reverse bend to provide a circumferentially extending channel, said ring having a series of circumferentially spaced, generally radial slots in one wall of the channel, and an elongated arcuate weight receivable within the channel and having a lateral projection receivable within one of said slots to prevent circumferential movement of the weight relative to the ring.

2. Wheel balancing means comprising a ring of thin metal, having a circumferentially extending, reversely bent margin providing a U shaped channel along one edge of the ring, said margin having a series of slots spaced circumferentially from one another, a weight receivable within said channel, and an integral projection on said weight adapted to fit within one of the slots to prevent movement of the weight circumferentially about the ring.

3. Wheel balancing means comprising a ring of thin metal, having a circumferentially extending, reversely bent margin providing a U shaped channel along one edge of the ring, means providing a series of tapered slots along said margin, a weight receivable within the channel, and a tapered wedgelike projection on the weight adapted to fit within one of the tapered slots to interlock the weight and the ring, to thereby prevent circumferential movement of the weight about the ring.

4. A combination of the character described for balancing a wheel comprising a ring of thin metal, having a circumferential reverse bend adjacent one edge providing a channel, said edge having a series of circumferentially spaced, tapered tabs providing a series of circumferentially spaced tapered slots in one wall of the channel, an elongated weight receivable within the channel so that the tabs extend across and project beyond one side of the weight, and projections on the weight receivable in said slots and engageable with the edges of adjacent tabs, said projecting tabs being bendable over the weight to retain the latter in the channel and to hold the projections against said tab edges.

5. In combination for balancing a wheel, a metal ring having a series of circumferentially spaced, generally radial slots therein, an elongated arcuate weight having approximately the same curvature as the ring, and a lateral projection on the weight and receivable within one of said slots to prevent circumferential movement of the weight relative to the ring.

HERMAN T. KRAFT.